United States Patent Office 3,314,751
Patented Apr. 18, 1967

3,314,751
METHOD FOR PRODUCING HEXAMMONIUM TETRAPOLYPHOSPHATE
Edward J. Griffith, Manchester, Mo., assignor to Monsanto Company, St. Louis, Mo., a corporation of Delaware
No Drawing. Filed Apr. 29, 1963, Ser. No. 276,153
5 Claims. (Cl. 23—107)

This invention pertains to a novel method for producing hexammonium tetrapolyphosphate.

Heretofore hexammonium tetrapolyphosphate has been prepared by forming tetrasodium tetrametaphosphate, hydrolyzing this phosphate to hexasodium tetrapolyphosphate, and by cation ion-exchange resins containing ammonium ions replacing the sodium cations with ammonium ions to produce the hexammonium tetrapolyphosphate. As can be appreciated, such a method of preparation requires many manipulative steps and additionally is time consuming and relatively expensive. Therefore, a method for preparing hexammonium tetrapolyphosphate which is relatively simple and straight forward would represent an advancement in this art.

An object of this invention is to provide an improved method for preparing hexammonium tetrapolyphosphate.

Another object of the invention is to provide a method for preparing hexammonium tetrapolyphosphate which is relatively simple and straight forward.

These and other objects will become apparent from the following detailed description.

It has been found that hexammonium tetrapolyphosphate, $(NH_4)_6P_4O_{13}$, can be produced by reacting lead tetrapolyphosphate and/or tin tetrapolyphosphate with an ammonium sulfide. The process is readily carried out by mixing powdered or granular lead tetrapolyphosphate and/or tin tetrapolyphosphate with an ammonium sulfide preferably in the presence of water in any suitable reaction vessel. The reaction is, in general, evidenced by the formation of a precipitate, such as, PbS or SnS.

Recovery of the hexammonium tetrapolyphosphate can be effected by any one of several standard techniques such as crystallization, extraction, etc. In general, the precipitate, i.e., PbS or SnS, can be removed by filtration from the hexammonium tetrapolyphosphate filtrate. If desired, the hexammonium tetrapolyphosphate can be further isolated by crystallization from the aqueous phase by well known procedures in the polyphosphate art such as using excess amounts of acetone, methyl alcohol and the like.

Lead tetrapolyphosphate is a known material which can readily be prepared by such procedures as heating lead dihydrogen-monohydrogen orthophosphate mixtures to a temperature above the thermal decomposition temperatures of the reactants but below the temperature of appearance of any liquid phase as described in the article by R. K. Osterheld and R. P. Langguth, J. Phys. Chem., 59, 76 (1955). Tin tetrapolyphosphate can also be prepared by, in general, the same procedures used for preparing lead tetrapolyphosphate.

The ammonium sulfides which may be used in practicing the present invention include ammonium sulfide, $(NH_4)_2S$, and ammonium hydrosulfide, $(NH_4)HS$. In addition, ammonium polysulfides can, in general, be used although their definite compositions are uncertain. When ammonium sulfide or ammonium hydrosulfide is used as one of the reactants the process is believed to proceed according to the following equation:

(1) $M_3P_4O_{13} + X(NH_4)_{2-n}H_nS \rightarrow (NH_4)_6P_4O_{13} + 3MS$ wherein M is a member selected from the class consisting of lead tetrapolyphosphate, tin tetrapolyphosphate and mixtures thereof, $n$ is an integer from 0 to 1 inclusive and X is equal to $6/2-n$.

The reaction is often exothermic so that, in many cases, it may be necessary to bring the reactants together while cooling, to dilute the mixture with an inert solvent, such as water and the like, or to add the lead tetrapolyphosphate and/or tin tetrapolyphosphate slowly to the aqueous solution of the ammonium sulfide. In some cases it may be necessary to employ all of the foregoing procedures. The ammonium sulfide compounds are relatively unstable so that an aqueous solution of such compounds is preferred in carrying out the reaction and, in addition, the aqueous solution permits a more complete reaction to take place by allowing the PbS or SnS precipitate to separate from the reactants and thus not hinder the reaction. In general, many concentrations of ammonium sulfide in water can be used, however, for best results concentrations above about .05% (g./ml.) and below about 75% (g./ml.) are suitable with concentrations between about 0.5% and 25% being especially preferred. Also, heating, in general, is not necessary and the reaction can usually be initiated at room temperature, i.e., about 25° C. If heat is used it tends to reduce the yield of the desired product by allowing the reactants to agglomerate and thus hinder their ability to react.

As indicated in the above Equation 1, the reactants react in molar proportions of 3:1 between lead- and/or tin-tetrapolyphosphate and ammonium sulfide, and 6:1 between lead- and/or tin-tetrapolyphosphate and ammonium hydrosulfide. Neither of the reactants need be present in excess, but on the other hand an excess of either reactant will not be detrimental.

The following typical example of the preparation of hexammonium tetrapolyphosphate will serve to illustrate more completely the process of the instant invention.

Example

Into a suitable reaction vessel about 168 grs. of lead tetrapolyphosphate and about 170 ml. of 9.1% ammonium sulfide are added to about 500 ml. of water. The reaction mixture is allowed to digest for about 5 hours. Lead sulfide, a black precipitate, is removed by filtration and the filtrate is treated with acetone in which the ammonium tetrapolyphosphate, a solid white crystalline substance, precipitates. Nuclear magnetic resonance analysis of the resulting product indicates that practically all of the phosphate is the desired tetrapolyphosphate.

Although the process for preparing hexammonium tetrapolyphosphate has been described with a degree of particularity, the invention herein is intended to be limited only by the claims set forth hereinafter.

What is claimed is:

1. A method for producing hexammonium tetrapolyphosphate which comprises reacting a tetrapolyphosphate selected from the class consisting of lead tetrapolyphosphate and tin tetrapolyphosphate with an ammonium sulfide in the presence of water and separating the resulting sulfide precipitate from the solution containing hexammonium tetrapolyphosphate.

2. A method for producing hexammonium tetrapolyphosphate which comprises reacting in the presence of water, a tetrapolyphosphate selected from the class consisting of lead tetrapolyphosphate and tin tetrapolyphosphate with an ammonium sulfide having the formula $(NH)_{2-n}H_nS$ wherein $n$ is an integer from 0 to 1 inclusive and separating the resulting sulfide precipitate from the solution containing hexammonium tetrapolyphosphate.

3. A method for producing hexammonium tetrapolyphosphate which comprises reacting in the presence of water lead tetrapolyphosphate and an ammonium sulfide having the formula $(NH)_{2-n}H_nS$ wherein $n$ is an integer from 0 to 1 inclusive and separating the resulting lead sulfide precipitate from the solution containing hexammonium tetrapolyphosphate.

4. A method for producing hexammonium tetrapolyphosphate which comprises reacting in the presence of water tin tetrapolyphosphate and an ammonium sulfide having the formula $(NH)_{2-n}H_nS$ wherein $n$ is an integer from 0 to 1 inclusive and separating the resulting tin sulfide precipitate from the solution containing hexammonium tetrapolyphosphate.

5. A method for producing hexammonium tetrapolyphosphate which comprises reacting lead tetrapolyphosphate and ammonium sulfide in the presence of water, said ammonium sulfide being present in a concentration between about 0.5% and 25% (gms./ml.), allowing said reaction mixture to digest for at least about 1 hour, removing the resulting lead sulfide and crystallizing the resulting filtrate.

References Cited by the Examiner
UNITED STATES PATENTS

| | | | |
|---|---|---|---|
| 2,414,742 | 1/1947 | Jackson | 23—106 |
| 2,592,273 | 4/1952 | Goebel et al. | 23—106 |

OTHER REFERENCES

Mellor: "A Comprehensive Treatise on Inorganic and Theoretical Chemistry," vol. 2, Longmans, Green and Co., New York, 1922, page 877.

Ross et al.: "Industrial and Engineering Chemistry," vol. 21, March 1929, pages 286 and 287.

Van Wazer: "Phosphorus and Its Compounds," vol. 1, Interscience Pub., Inc., New York, 1958, pages 660–663.

OSCAR R. VERTIZ, *Primary Examiner.*

MILTON WEISSMAN, *Examiner.*

H. T. CARTER, *Assistant Examiner.*